United States Patent

Barrett et al.

[15] 3,701,123

[45] Oct. 24, 1972

[54] HYBRID INTEGRATED CIRCUIT MODULE

[72] Inventors: John C. Barrett, Sunnyvale; Howard C. Borden, Atherton; Egon E. Loebner, Palo Alto, all of Calif.

[73] Assignee: Hewlett Packard Company, Palo Alto, Calif.

[22] Filed: Oct. 29, 1969

[21] Appl. No.: 872,031

[52] U.S. Cl.........340/173 LS, 340/324 R, 315/169 R

[51] Int. Cl. .......G11c 11/42, H01l 1/22, H05b 33/14

[58] Field of Search......340/174 MA, 324 R, 173 SS, 340/173 FF; 307/279; 315/169

[56] References Cited

UNITED STATES PATENTS

| | | | |
|---|---|---|---|
| 3,240,990 | 3/1966 | Blank et al. | 315/169 R |
| 3,548,254 | 12/1970 | Pahlavan | 340/324 |
| 3,315,248 | 4/1967 | Benn et al. | 340/324 |
| 3,201,764 | 8/1965 | Parker | 340/173 |
| 3,258,644 | 6/1966 | Rajchman | 340/173 X |
| 3,292,008 | 12/1966 | Rapp | 340/173 X |
| 3,309,534 | 3/1967 | Yu et al. | 340/173 X |
| 3,361,988 | 1/1968 | Chynoweth | 340/173 X |
| 3,416,008 | 12/1968 | Memelink et al. | 307/279 |
| 3,423,737 | 1/1969 | Harper | 340/173 |

*Primary Examiner*—Stanley M. Urynowicz, Jr.
*Attorney*—Stephen P. Fox

[57] ABSTRACT

A visual display module includes a thin thermally conductive substrate. The substrate has a narrow top edge surface on which a linear array of closely spaced electroluminescent display elements are mounted, a bottom edge surface along which there are disposed terminals for receiving input power and binary coded signals for controlling the display elements, and a lateral surface on which an integrated circuit chip and a signal conductors are located. The integrated circuit chip contains a decoding network for selectively addressing the display elements in response to the binary coded signals, write-erase gating means for conditioning an addressed display element into an "on" or "off" state, and memory circuits for holding each display element in its "selected" state. The display elements are disposed in a viewing plane perpendicular to the lateral surface of the substrate, so that a plurality of modules can be stacked adjacent to one another to produce an expandable high density display field.

8 Claims, 4 Drawing Figures

INVENTORS
JOHN C. BARRETT
HOWARD C. BORDEN
EGON E. LOEBNER

BY Stephen P. Fox
AGENT

INVENTORS
JOHN C. BARRETT
HOWARD C. BORDEN
EGON E. LOEBNER

BY Stephen P. Fox
AGENT

HYBRID INTEGRATED CIRCUIT MODULE

BACKGROUND OF THE INVENTION

Solid state visual displays have been suggested for use as readouts in test instruments, radar systems, data processing systems and the like. One type of display has been formed of an array of electroluminescent picture elements such as gallium-arsenide-phosphide light emitting diodes. Typically the diodes are arranged in a field pattern relating to the particular information to be displayed. Where high resolution is required, a large number of light emitting diodes would be used in the field pattern. The light emitting elements are individually accessed so that each may be separately selected by a common control logic circuit to provide a versatile display capability.

As the number of light emitting diodes in the display field is increased, the control logic and interconnection circuitry for addressing each diode becomes complex. For large arrays of diodes, the addressing may be simplified by using sequential scanning techniques; however in this case the duty cycle during which each diode is selected is small, thus requiring that the magnitudes of the driving power pulses which energize the diodes be excessive. Also the overall power consumption of the system may be high, and difficulties arise in dissipating the thermal energy produced. It is desirable to provide a display wherein a large number of light emitting elements are closely spaced in a resolution field pattern and wherein the array of elements may be expanded easily in two dimensions. However, the packaging of the circuit components and configuration of the input/output connections according to conventional techniques may become difficult to realize and economically impracticable.

SUMMARY OF THE INVENTION

The present invention, as illustrated, is a novel hybrid integrated circuit module in which display elements are disposed in one plane and the logic for controlling the display elements is a microminiturized integrated network disposed in another plane perpendicular to the display plane. The module serves as a basic building block capable of low cost mass production, and the multiplane configuration permits a plurality of modules to be stacked side-by-side and end-on-end in an array to produce a high resolution display field of any desired format. The display elements are densely packed with close center-to-center spacings, and each element may be individually addressed, so that the display is capable of indicating a wide variety of information with high resolution. The number of access signal lines for the display is minimized because each module contains its own logic for addressing the display elements of the module and the modules may be arranged in an array so that they all respond to the same binary coded signals produced by a common source. The module is formed on a substrate which has a high thermal conductivity and transmits heat energy to suitable heat sinking means, thereby enabling minimization of the temperature rise of the module during operation.

The preferred embodiment of the present invention includes a thin metal substrate, and a plurality of closely spaced electroluminescent elements disposed in a linear array along the top edge surface of the substrate in a viewing plane which is perpendicular to the lateral surfaces of the substrate. A monolithic integrated circuit chip is mounted on a lateral surface of the substrate and provides the logic for controlling the array of electroluminescent display elements. The integrated circuit chip contains decoding circuitry responsive to BCD signals for selectively addressing each display element, write-erase gating means for conditioning the addressed elements to be energized or de-energized, and memory circuits associated with the display elements for holding them in an energized or de-energized condition. Signal receiving input terminals are disposed along the bottom edge surface of the substrate. The integrated circuit chip is connected to both the input terminals and the display elements by an electrical conductor pattern overlaying an electrically insulated surface of the substrate.

DESCRIPTION OF THE PREFERRED EMBODIMENTS

Figure 1:
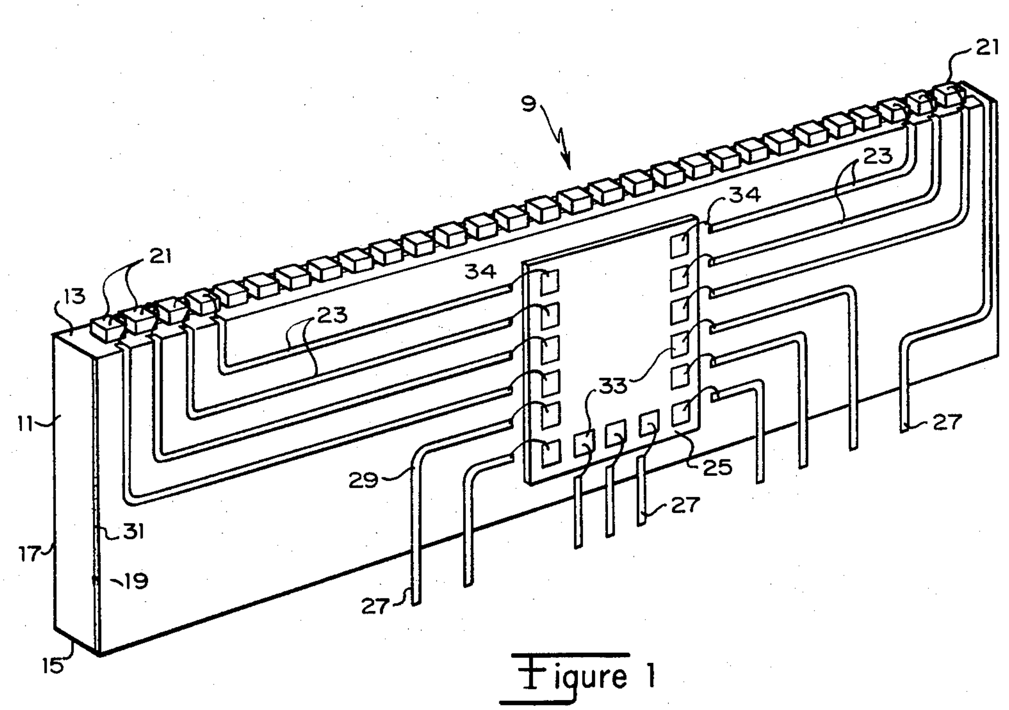
FIG. 1 is a perspective view of the preferred embodiment of the hybrid integrated circuit module of the invention.

Referring now to FIG. 1, the hybrid integrated circuit module 9 includes a thin panel or sheet-like substrate 11 formed of a thermally conductive material such as aluminum. As viewed in the drawing, the substrate 11 has top and bottom edge surfaces 13,15 respectively, and two lateral surfaces 17,19. Along the top edge surface 13, there are mounted a plurality of indicating elements 21 disposed in a linear array in spaced-apart relation. Each of the indicating elements 21 is preferably an electroluminescent device such as a gallium-arsenide-phosphide light emitting diode. However the indication of information by the emission of radiation may be accomplished with other types of elements such as liquid crystals or gas plasma devices. The display elements 21 are arranged to emit light upwardly from the top edge 13, so that the array of devices 21 form a viewing plane which is substantially perpendicular to the lateral surfaces of the substrate 11.

The electroluminescent display elements 21 each have two terminals. The bottom terminals of the display elements are connected in common to a conductive strip on the top edge 13 of the substrate 11. The other terminals of the display elements 21 are individually coupled through conductors 23 to the output contacts of a control circuit contained in an integrated network 25. In the preferred embodiment of the invention, the integrated network is a monolithic integrated circuit chip about .112 inch square; however other devices such as magnetic bubbles or finite cores may also be used. As hereinafter described, the integrated circuit chip contains control logic which is capable of individually addressing and energizing or de-energizing each of the display elements 21. The input signals to the integrated circuit control logic 25 are in the form of binary coded signals. These signals are received by a plurality of input terminals 27 disposed along the bottom edge 15 of the substrate 11 and are coupled to the integrated circuit 25 through conductors 29.

The input and output conductors 29 and 23 respectively are disposed on the lateral surface 19 of the substrate and insulated therefrom by a thin film dielectric 31. The conductors 23,29 overlay the dielectric film 31, and may be formed using suitable metal plane wiring techniques for example. The conductors 23,29 terminate adjacent to the periphery of the integrated circuit chip 25, the latter of which has a plurality of input and output contact points 33 which are connected to the conductors 23,29 by wire leads 34.

It can be seen that the integrated circuit chip 25 and the input and output conductors therefor are disposed parallel to the lateral surfaces 17,19 of the substrate 11, whereas the linear array of indicating elements 21 is disposed in a viewing plane which is perpendicular to the lateral surfaces. More particularly, indicating elements 21 are disposed along the top edge surface 13 of the substrate, the input terminals 27 are disposed along the bottom edge surface 15 of the substrate and the integrated circuit control logic for driving the indicating elements is disposed on a lateral surface of the substrate between the input terminals and the indicating elements. The metal substrate acts to conduct thermal energy to a suitable heat sink, not shown, to thereby dissipate heat produced during operation of the indicating elements and integrated circuit. As described later, the control logic contained in the module 9 permits a minimum number of input terminals to be used and also provides a highly versatile display control capability.

Figure 2:
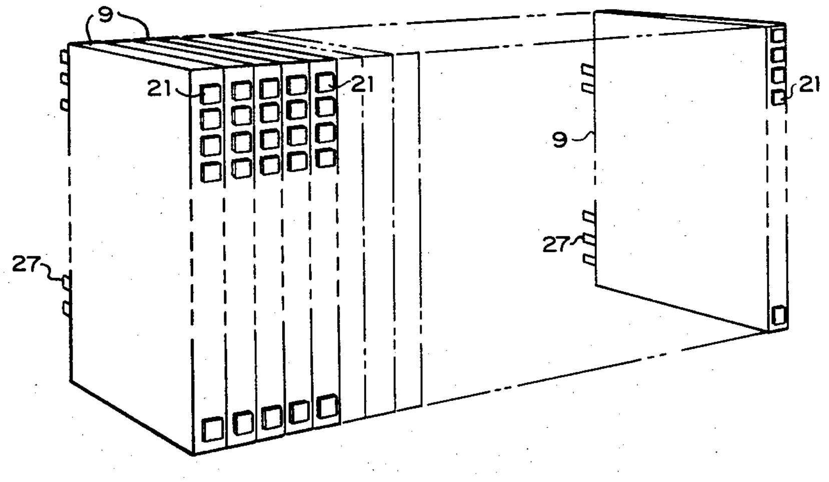
FIG. 2 is a perspective view of a stacked array of the modules of FIG. 1.

The module 9 of FIG. 1 is capable of miniturized construction and may be used as the basic building block in a display having a large number of indicating elements. FIG. 2 illustrates how a plurality of the modules 9 may be stacked side by side to produce a two dimensional display comprised of stacked linear arrays of discrete electroluminescent elements 21. In the case where the electroluminescent elements are gallium-arsenide-phosphide light emitting diodes, the light emitting area of each diode may be on the order of 0.017 inches square. In a single module 9, the diodes may be spaced apart linearly with a center-to-center spacing of 0.025 to 0.100 inch, for example. The overall thickness of the module, including the thin metal panel substrate 11, the insulating film 31 and overlaying conductors, the integrated circuit chip 25, and suitable encapsulating material not shown, may be maintained small, on the order of 0.100 inch or less. Therefore, when a plurality of modules 9 are stacked side by side, the center-to-center spacing between the light emitting diodes of adjacent modules may be made the same as the center-to-center spacing between diodes of the same module, both spacings typically being on the order of 0.100 inch. Even closer spacings between diodes may be achieved by forming two rows of diodes along the top edge surface of each module. The close spacing of diodes permits a high density arrangement of diodes in the viewing field, thereby enabling high resolution and spatial uniformity in displaying information. As shown in FIG. 2, the front surface of the modular array of diodes forms the viewing plane of the display, and all input control signals therefor are applied at the rear surface, thereby enabling convenient signal input connections.

Figure 3:
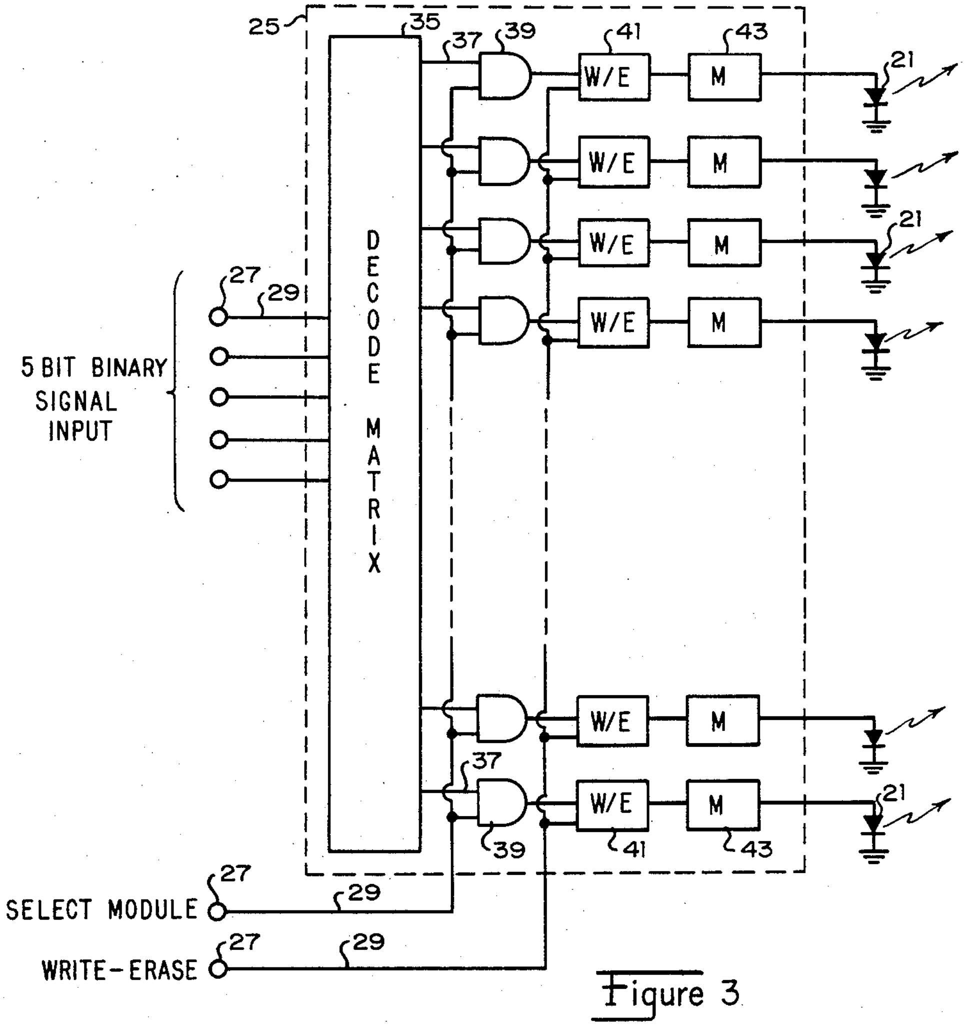
FIG. 3 is a block diagram of the integrated circuit control logic of the module of FIG. 1.

FIG. 3 illustrates in block diagram form the control logic in the integrated circuit chip 25 for driving the electroluminescent elements 21 of the module 9. Each of the electroluminescent elements 21 may be individually addressed, switched into an energized light emitting mode or a de-energized dark mode and maintained in the selected mode of operation. A multi-bit binary address for controlling the elements 21 is applied to the input terminals 27 and coupled through the input conductors 29 to a decoding matrix 35. As shown, the input signal comprises five bits. In this case, the decoding matrix 35 may comprise a transistor network configured to decode the five bit input signals into a maximum of 32 mutually exclusive addressing line signals 37, each of which corresponds to a different one of the electroluminescent devices 21. Each of the line signals 37 is coupled to one input of a two input AND gate 39. The other input of each AND gate 39 is connected to a common terminal designated "select module." This terminal receives a signal which controls the AND gate 39 to either enable or inhibit transmission of the addressing signals over line 37.

The addressing signals which appear at the outputs of AND gates 39 are respectively coupled to write-erase (W/E) gates 41 and thence through respective memory circuits (M) 43 to the electroluminescent elements 21. In FIG. 3, the elements 21 are gallium-arsenide-phosphide light emitting diodes and are represented by conventional diode symbols; however as stated above, other types of indicating elements may be used.

The memory circuit 43 are preferably bistable latch circuits as hereinafter described. Each memory circuit operates to hold its corresponding light emitting diode in either an energized "on" state, or in a de-energized "off" state during the time intervals between addressing signals. When a particular diode is addressed by a signal on the corresponding one of the signal lines 37, the state into which the diode is driven depends on the operation of its corresponding write-erase gate 41. Each write-erase gate has a conditioning input which is coupled to a common terminal designated "write-erase." When a write signal is applied to this terminal, the particular write-erase gate to which an addressing signal is simultaneously applied will switch its memory circuit 43 to maintain the corresponding diode in an energized state. Conversely, when an erase signal is applied to the "write-erase" terminal, an addressed write-erase gate will switch its memory circuit to maintain the corresponding diode in a de-energized state.

It is to be noted that with the control circuit configuration of FIG. 3, the linear array of indicating elements 21 may be addressed sequentially and selectively by the input signals applied to terminals 27, and any indicating element which is addressed may be energized or de-energized under control of the write-erase signal. Each indicating element has its own memory circuit, so that it is maintained in an energized or de-energized condition during the time that no addressing signals are received. Because the module 9 contains its own decoding circuitry, the number of input connections required is minimized, and overall display capability and versatility are enhanced. When a plurality of modules are stacked side-by-side as shown in FIG. 2, the input signals are applied in common to all modules, and a desired display pattern may be produced by selecting each module in sequence by pulsing the corresponding "select module" input, and then addressing one or more of the indicating elements 21 in the selected module with the appropriate binary input signals during the time that the module is selected. As described above, the particular indicating elements addressed are either energized or de-energized in accordance with the input signal on the common "write-erase" terminal. Since the module may be selected one at a time by pulsing the "select module" terminal, the total input power to the display system is conserved.

Figure 4:
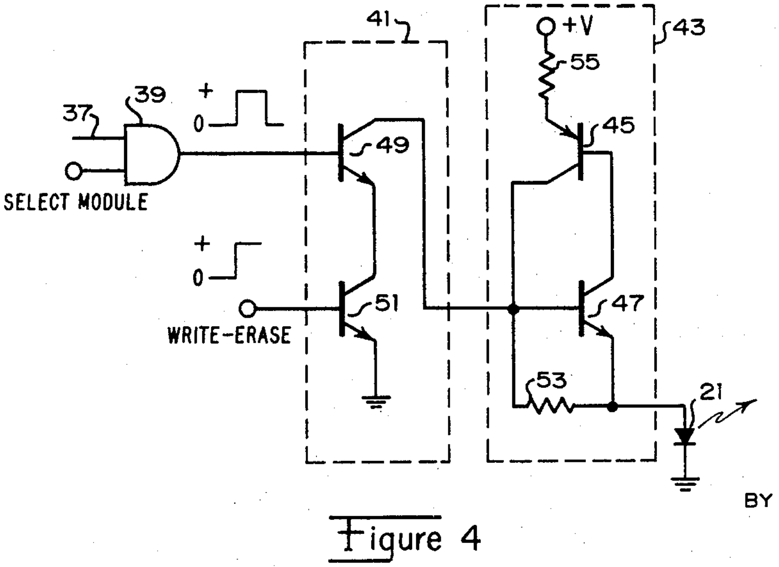
FIG. 4 is a schematic diagram of the preferred embodiment of the memory circuits shown in FIG. 3.

A feature of the present invention is the circuit combination for the write-erase gates 41 and memories 43 of FIG. 3. The preferred embodiment of the circuit configuration is illustrated in FIG. 4. This circuit has the advantage that it may be implemented in an integrated circuit chip using a minimum surface area. This is important because a large number of the circuits are used, i.e. one for each indicating element 21 in the module, and the size of the integrated circuit chip 25 is a factor in determining how many indicating elements 21 can be contained in a closely spaced array in each module.

The memory circuit 43 is a bistable latch circuit including first and second transistors 45,47 having complementary conductivities. In one mode, transistors 45,47 are both off so that the light emitting diode 21 is deenergized and no light is emitted therefrom. In the other mode of operation, transistors 45,47 are both on, so that current is conducted from the potential source, +V, through the emitter-base junction of transistor 45 and the collector-emitter current path of transistor 47 to energize the diode 21.

The transistors 45,47 are driven into their conducting mode or non-conducting mode by an input signal applied to the base electrode of transistor 47. This input control signal is received from the write-erase gate 41 which includes third and fourth transistors 49,51 connected in series. The base electrode of transistor 49 is coupled to receive an addressing signal from the associated one of the AND gates 39, and the base electrode of transistor 51 is coupled to the common "write-erase" control terminal for the module.

When the input voltage at the "write-erase" terminal (i.e. at the base of transistor 51) is low, corresponding to a write signal, transistor 51 will be non-conducting. At this time, a high level addressing signal from the output of gate 39 will cause current to be conducted through the base-collector junction of transistor 49 and the base-emitter junction of transistor 47. As a result, transistor 47 will be biased toward conduction. The voltage applied to the emitter of transistor 45 is chosen to be higher than that on the base of transistor 47, so that transistor 45 will also be biased toward conduction. The regenerative effect of the amplification factors of transistors 45,47 will cause these two transistors to latch in the conducting mode and maintain this condition after the addressing and write signals are removed from the base electrodes of transistors 49,51. In the absence of an addressing signal from the output of gate 39, the collector-base junction of transistor 49 is biased so as to prevent emitter-collector current flow therethrough and thereby prevent inadvertent writing or erasing of memory 43.

When the input voltage at the "write-erase" terminal is high, corresponding to an erase signal, and a high level addressing signal is simultaneously applied to the base of transistor 49, both transistors 49,51 will be biased on and the series connection thereof will conduct current out of the base electrode of transistor 47. As a result, transistor 47 will be biased toward non-conduction thereby reducing the base drive of transistor 45. The magnitudes of the erase and addressing signals are made large enough so that they cause transistors 49,51 to conduct sufficient current out of the latch circuit 43 to ensure turn off. After the two transistors 45,47 are driven into the non-conducting mode, they maintain this condition when the addressing and erase signals are removed.

A resistor 53 is connected between the base and emitter electrodes of transistor 47 in order to stabilize the operation of transistors 45,47 and insure that they remain off after being driven into the non-conducting mode. Resistor 53 also serves to set the threshold level and noise margin for the base current of transistor 47 at which the latch circuit will switch from one mode to the other. Another resistor 55 serves to limit the drive current through transistors 45,47 and the light emitting diode 21.

It is to be noted that the power supplied through the terminal +V in memory circuit 43 may be completely separate from the power required for driving the addressing logic circuitry. The memory latch circuit 43 will maintain a steady state on or off condition in the absence of an input signal. Therefore, during interim periods between addressing and write-erase signals, the logic power supply may be turned off, thereby conserving power and reducing the production of thermal energy in the module. This is a particularly important feature in systems incorporating a large number of modules.

The configuration of modules 9 may be expanded to produce display fields larger than that shown in FIG. 2. For example the modules may be stacked end on end as well as side-by-side. Preferably the overall display system is arranged so that all modules receive the same binary input signals, and the display pattern is produced by selecting the modules in sequence as described above. The entire display field can be erased by momentarily uncoupling the memory circuits 43 from the common potential source +V Thereafter, all memory circuits 43 will be held in the non-conducting mode and the indicating elements will be de-energized in preparation for displaying new information.

What is claimed is:

1. A conditionable bistable memory circuit responsive to two signals for driving a light emitting diode from a potential source, said memory circuit comprising:

first and second bipolar transistors of complimentary conductivity types and each having two main current carrying electrodes and a control electrode;

the control electrode of each transistor being coupled to one main current carrying electrode of the other transistor;

the other main current carrying electrode of the first transistor being coupled to said potential source, and the other main current-carrying electrode of the second transistor being coupled to said light emitting diode;
a single control input coupled only to the control electrode of one of said first and second transistors;
third and fourth transistors each having a pair of main current carrying electrodes and a control electrode;
said main current carrying electrodes of said third and fourth transistors being coupled in series to said single control input;
said third and fourth transistors both being of the same conductivity type as said one of the first and second transistors to which said single control input is coupled;
the control electrode of one of said third and fourth transistors being coupled to one of said two input signals; and
the control electrode of the other of said third and fourth transistors being coupled to the other of said two input signals;
whereby said one input signal operates to condition said first and second transistors to be latched in either a conducting or non-conducting mode in response to said other input signal.

2. The circuit of claim 1, further including resistance means coupled between the control electrode of said second transistor and the main current carrying electrode of said second transistor which is coupled to said load, said resistance means being operable to set the threshold level between conducting and non-conducting modes of the memory circuit.

3. A hybrid integrated circuit module comprising:
a substrate having a plurality of planar surfaces;
a plurality of indicating elements disposed solely on a first one of said surfaces of said substrate;
a plurality of signal receiving terminals disposed solely along a second surface of said substrate which is opposite to said first surface, the number of said signal receiving terminals being less than the number of said indicating elements;
signal translating integrated network means mounted on said substrate intermediate said first and second opposite lateral surfaces for selectively energizing and de-energizing each one of said plurality of indicating elements in response to coded signals applied to said plurality of signal receiving terminals; and
conductor means disposed on said substrate for electrically coupling said plurality of indicating elements and said plurality of signal receiving terminals to said signal translating integrated network means.

4. The module of claim 3,
said substrate including an electrically and thermally conductive sheet wherein said first and second opposite surfaces are edges of said sheet in parallel planes, and an electrically insulating film overlaying a lateral surface of said sheet intermediate said first and second edges;
said conductor means being a conductor pattern overlaying said insulating film and including said signal receiving terminals and also including contact points coupled to said indicating elements and said signal translating integrated network means said signal receiving terminals being disposed to extend beyond said second edge surface; and
said signal translating integrated network means being a monolithic integrated circuit chip having contact points coupled to selected ones of said contact points of said conductor pattern.

5. The module of claim 3, wherein said signal translating integrated network means includes:
decoding means having a plurality of inputs for receiving binary signals applied to said plurality of signal receiving terminals, and a plurality of outputs providing addressing signals corresponding respectively to said plurality of indicating elements;
a plurality of means for respectively coupling each output of said decoding means to the corresponding one of said indicating elements, each of said coupling means including:
first means for gating the addressing signals from an output of said decoding means, said first gating means having an enabling input;
memory means responsive to the addressing signals gated by said first gating means for holding the corresponding one of said indicating elements in an energized or de-energized state; and
means for coupling the enabling inputs of said first gating means in common for receiving a module enabling signal.

6. The module of claim 5, wherein each of said plurality of coupling means further includes second gating means coupled between said first gating means and said memory means, said gating means having a write-erase control input for conditioning said memory means to energize or de-energize said indicating element in synchronism with the output from said first gating means, and wherein said signal translating integrated network means further includes means for coupling said write-erase control inputs in common for receiving a write-erase signal.

7. The module of claim 6,
said memory means including a bistable latch circuit including:
first and second bipolar transistors of complementary conductivity types and each having base, emitter and collector electrodes;
the base electrode of each transistor being coupled to the collector electrode of the other transistor;
the emitter electrode of the first transistor being connectable to a potential source, and the emitter electrode of the second transistor being coupled to the corresponding one of said indicating elements; and
a single control input coupled only to the base electrode of one of said first and second transistors for conditioning both of said transistors in either a conducting or a non-conducting mode;
said second gating means including:
third and fourth transistors of like conductivity types and each having a pair of main current carrying electrodes and a control electrode;
the main current carrying electrodes of said third and fourth transistors being coupled in series to said single control input;

the control electrode of one of said third and fourth transistors being coupled to the output of said first gating means, and the control electrode of the other of said third and fourth transistors being coupled to said write-erase control input to energize or de-energize indicating elements addressed by said decoding means in response to said write-erase signal and in synchronism with said module enabling signal.

8. The module of claim 7, wherein each of said plurality of indicating elements is a semiconductor light emitting diode.

* * * * *